United States Patent [19]

Albrecht

[11] Patent Number: 5,039,133
[45] Date of Patent: Aug. 13, 1991

[54] SUCTION NOZZLE COUPLING HAVING ROTATABLY MOUNTED THEREIN A CONNECTOR FOR A SUCTION HOSE

[75] Inventor: Eckart Albrecht, Romanshorn, Switzerland
[73] Assignee: Düpro AG, Romanshorn, Switzerland
[21] Appl. No.: 463,614
[22] Filed: Jan. 11, 1990
[51] Int. Cl.⁵ .................................. A47L 9/24
[52] U.S. Cl. ............................. 285/7; 283/921; 283/298
[58] Field of Search ............ 285/7, 921, 298, 321, 285/703

[56] References Cited

U.S. PATENT DOCUMENTS

| | | | |
|---|---|---|---|
| 2,198,905 | 4/1940 | Content | 285/7 |
| 2,444,888 | 7/1948 | Baumgardner | 285/7 |
| 3,167,330 | 1/1965 | Draudt | 285/7 |
| 3,212,795 | 10/1965 | Helm et al. | 285/7 |
| 3,239,244 | 3/1966 | Leinfelt | 285/7 |
| 3,262,718 | 7/1966 | Draudt | 285/7 |
| 3,832,753 | 9/1974 | Crooks | 285/7 |
| 4,211,438 | 7/1980 | Asberg | 285/7 |
| 4,537,424 | 8/1985 | Maier et al. | 285/7 |
| 4,747,179 | 5/1988 | Berfield | 285/7 |
| 4,941,689 | 7/1990 | Sjöberg | 285/7 |

FOREIGN PATENT DOCUMENTS

| | | | |
|---|---|---|---|
| 746389 | 11/1966 | Canada | 285/7 |
| 647115 | 6/1937 | Fed. Rep. of Germany | 285/7 |
| 93427 | 11/1938 | Sweden | 285/7 |
| 242470 | 11/1925 | United Kingdom | 285/7 |
| 543241 | 2/1942 | United Kingdom | 285/7 |
| 663539 | 12/1951 | United Kingdom | 285/7 |

Primary Examiner—Eric K. Nicholson
Attorney, Agent, or Firm—Robert W. Becker & Associates

[57] ABSTRACT

A coupling of a suction nozzle, with a connector of a suction hose of a vacuum cleaner being rotatably mounted in the coupling, whereby the connector, on an end thereof that faces the suction nozzle, is provided with a larger diameter flange that for the axial fixation and rotatable mounting of the connector extends into an undercut of a cylindrical receiving opening of the coupling. A sleeve is provided between the connector and the receiving opening of the coupling. Cooperating arresting means are provided on the sleeve and the coupling for connecting the same, whereby the sleeve, together with the coupling, form the undercut thereof.

10 Claims, 3 Drawing Sheets

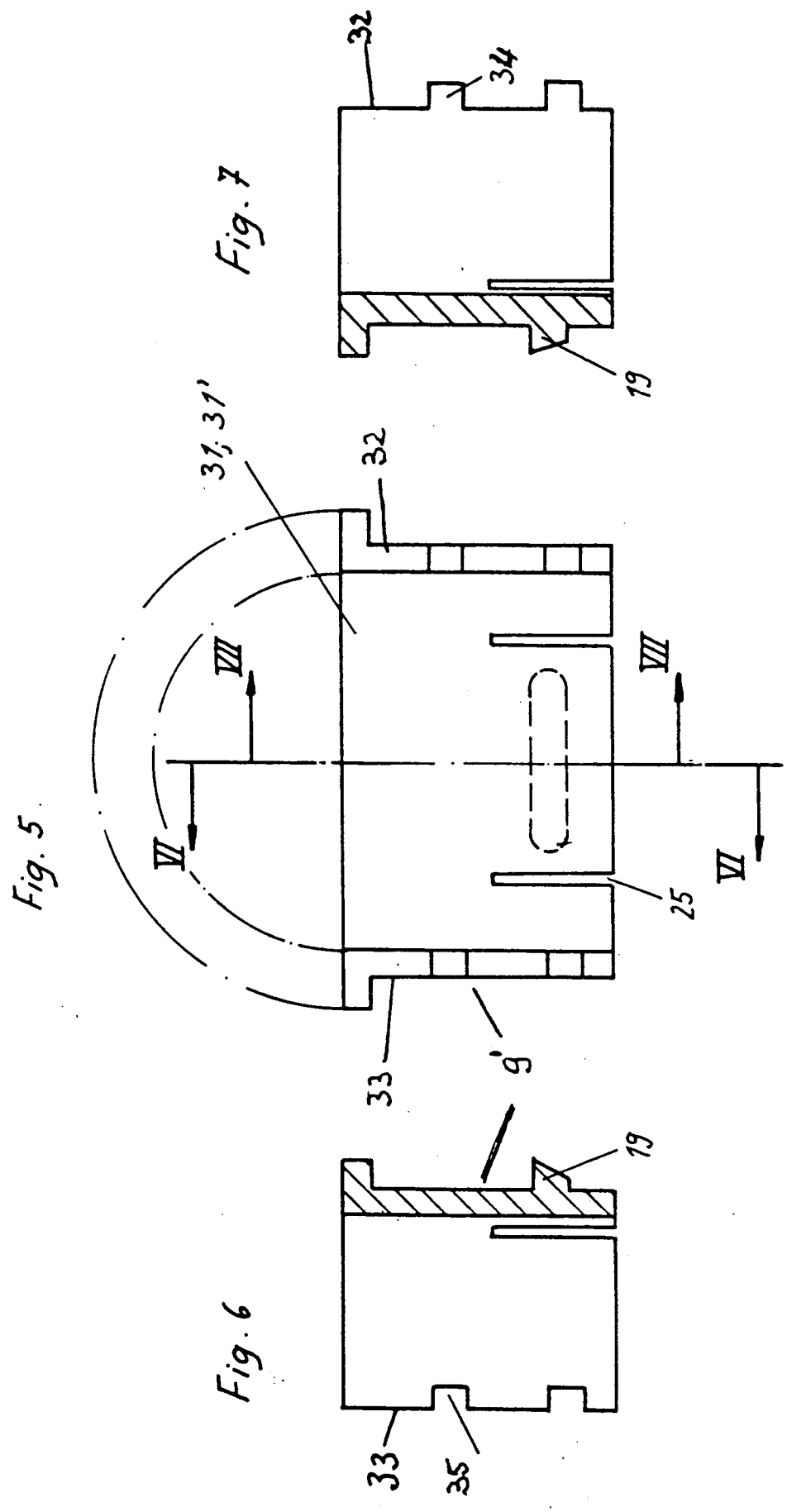

SUCTION NOZZLE COUPLING HAVING ROTATABLY MOUNTED THEREIN A CONNECTOR FOR A SUCTION HOSE

BACKGROUND OF THE INVENTION

The present invention relates to a coupling of a suction nozzle, with a connector of a suction hose or the like of a vacuum cleaner being rotatably mounted in the coupling, whereby the connector, on an end thereof that faces the suction nozzle, being provided with a larger diameter flange that for the axial fixation and rotatable mounting of the connector extends into an undercut of a cylindrical receiving opening or hole of the coupling.

To rotatably connect the suction hose of a vacuum cleaner to the suction nozzle, it is known to rotatably mount the connector, which receives the suction hose, in the coupling of the suction tool or nozzle. This rotatable mounting is necessary because when the suction nozzle is being used, the flexible suction hose carries out partial rotations about its longitudinal axis as a consequence of the back and forth movements of the nozzle.

To provide for an easy rotation and at the same time reliable axial fixation of the connector that receives the suction hose, that end of the connector that extends into the coupling of the suction nozzle is provided with a flange that has a diameter that is greater than that of the adjoining portion of the connector. This flange catches in an undercut that is formed in the receiving bore or opening of the coupling. The width and diameter of this undercut is greater than the thickness and the outer diameter of the flange on the connector, so that the connector is easily rotatably mounted and axially fixed in the coupling. Unfortunately, providing the undercut in the receiving hole of the coupling is very complicated and correspondingly expensive since this is accomplished by an additional machining process. Due to the fact that the coupling is produced as a thermoplastic molded part, the machining process produces burrs that are very complicated to remove.

It is therefore an object of the present invention to improve a suction nozzle coupling of the aforementioned general type in such a way that a subsequent machining or finishing of the coupling, in particular for the rotatable connection of the connector, is eliminated, and the coupling can on the whole be produced in a simple and economical manner.

BRIEF DESCRIPTION OF THE DRAWINGS

This object, and other objects and advantages of the present invention, will appear more clearly from the following specification in conjunction with the accompanying schematic drawings, in which:

FIG. 5 is an elevational view of a different embodiment of the inventive sleeve, which comprises two halves;

FIG. 6 is a cross-sectional view through the sleeve half of FIG. 5 and is taken along the line VI—VI thereof; and FIG. 7 is a cross-sectional view through the sleeve half of FIG. 5 and is taken along the line VII—VII thereof.

SUMMARY OF THE INVENTION

The swivel coupling of the present invention is characterized primarily in that a sleeve is provided between the connector and the cylindrical receiving opening or hole of the swivel socket or coupling, and in that cooperating arresting means are provided on the sleeve and the swivel socket or coupling for connecting the same, whereby the sleeve, together with the swivel socket or coupling, form the undercut thereof.

The underlying concept of this approach is the placement of a sleeve into the cylindrical receiving opening of the swivel socket or coupling of the suction nozzle. The length of the sleeve is less than the depth of the inner cylindrical receiving opening or hole of the swivel socket or coupling, so that a free space in the form of an undercut is formed between the end face of the sleeve and the end surface of the receiving opening for accommodating the larger diameter flange of the connector that is inserted into the sleeve. To hold this sleeve in the receiving opening of the swivel socket or coupling, the sleeve is provided on its outer peripheral surface with arresting means, for example two oppositely disposed arresting cams or dogs, that project from this outer surface and extend into associated openings in the wall of the swivel socket or coupling. In this connection, to facilitate insertion of the sleeve into the receiving opening of the swivel socket or coupling, the arresting dogs can be appropriately inclined in the insertion direction, or can have some other suitable configuration. The parts that are disposed in the insertion direction of the sleeve are advantageously resiliently flexible, for example by providing suitable slits in the sleeve or by weakening or reducing the thickness of the material in individual portions of the sleeve, so that at least one resilient tongue is formed that makes it easy for, for example, the arresting means, namely the dogs, to engage in the associated receiving holes or openings. The introduction of the sleeve into the receiving opening of the swivel socket or coupling can be furthermore simplified by providing in the vicinity of the opening rim of the swivel socket or coupling opening one or more recessed portions of limited width into which the arresting means, preferably the arresting dogs, fit during insertion of the sleeve, thus facilitating insertion of the sleeve into the swivel socket or coupling.

Further specific features of the present invention will be described in detail subsequently.

DESCRIPTION OF PREFERRED EMBODIMENTS

Figure 1:
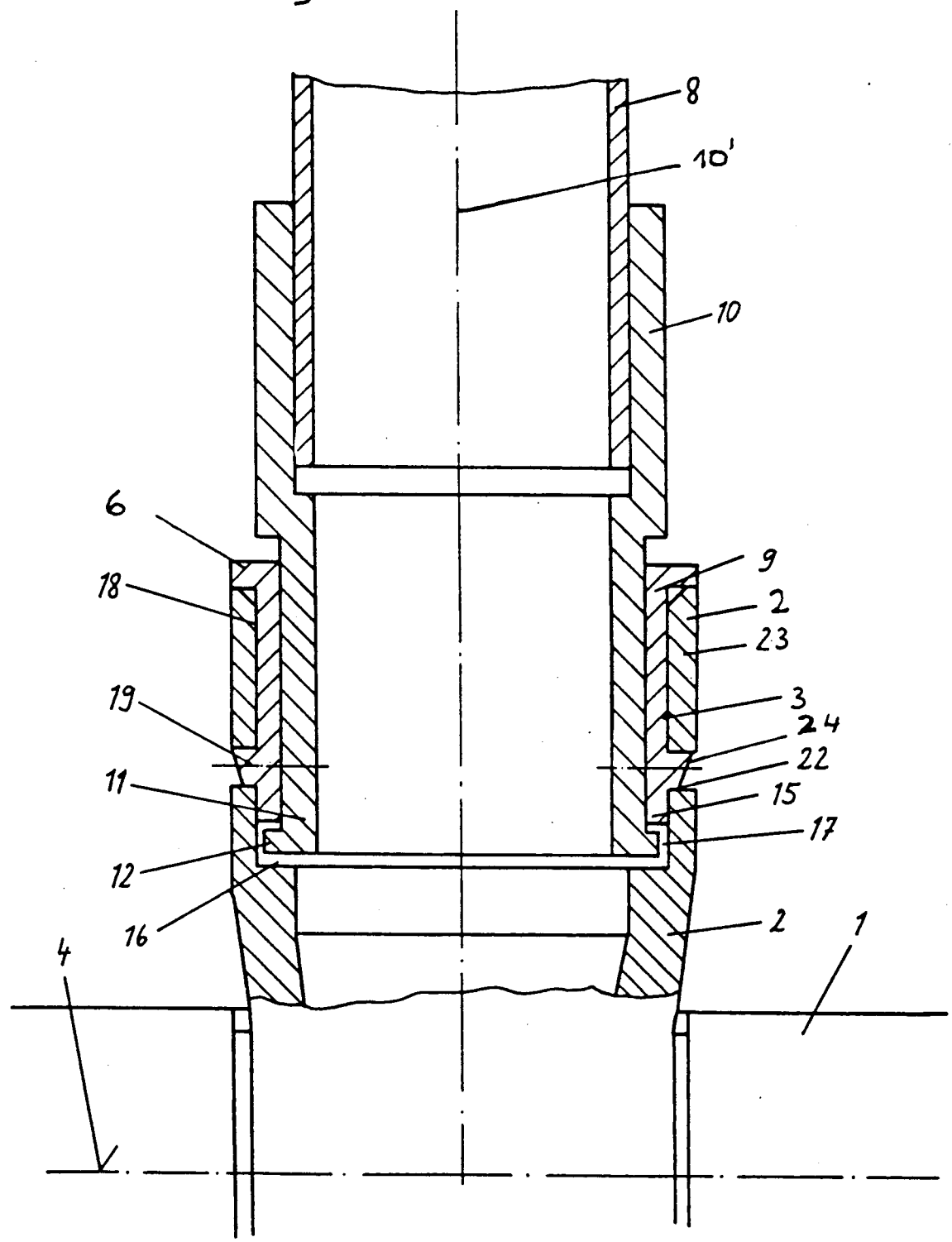
FIG. 1 is a partial longitudinal cross-sectional view of one exemplary embodiment of the present invention showing a suction nozzle to which is connected a coupling that receives a suction hose.
Figure 2:
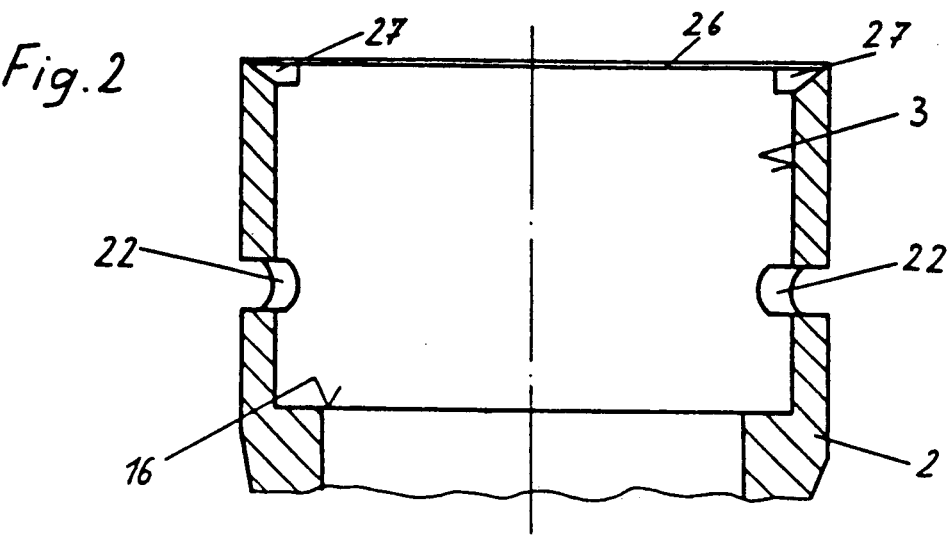
FIG. 2 is a partial longitudinal cross-sectional view through the coupling of FIG. 1.
Figure 3:
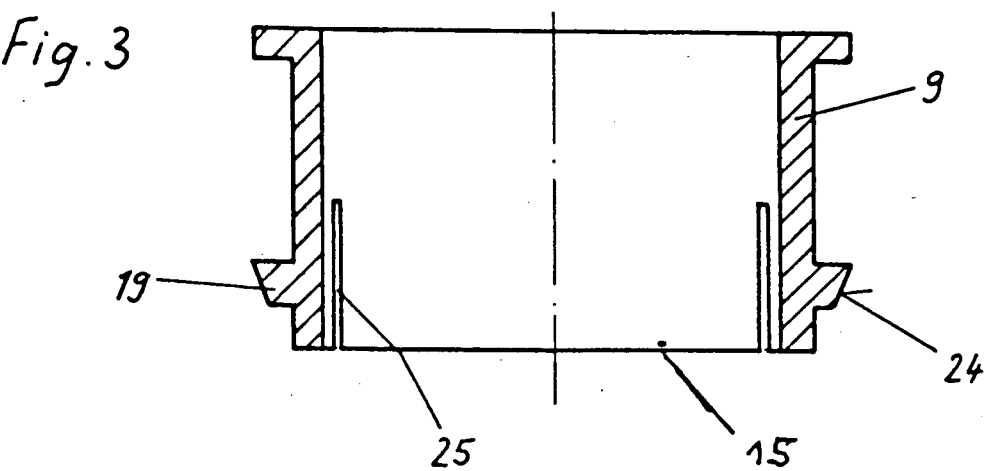
FIG. 3 is a longitudinal cross-sectional view through the sleeve of FIG. 1.
Figure 4:
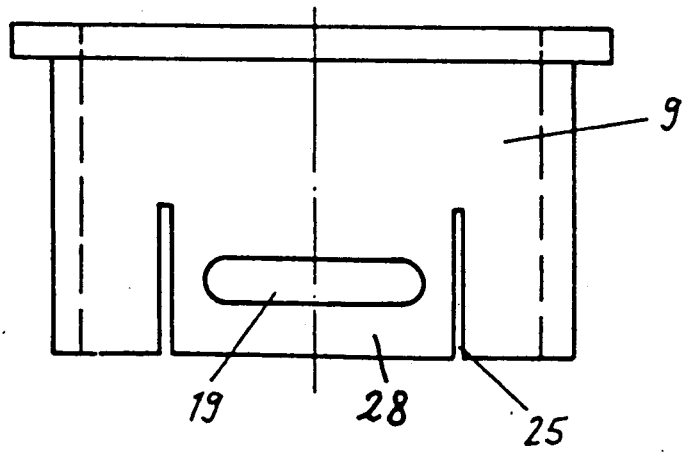
FIG. 4 is an elevational view of the sleeve of FIG. 1.

Referring now to the drawings in detail, FIG. 1 shows a portion of a suction nozzle 1, which is of known construction and is part of a vacuum cleaning unit, for example a vacuum cleaner, the rest of which is not shown. In order to establish a flow-transferring connection with the interior of the vacuum cleaning unit, a swivel socket or coupling 2 is pivotably mounted on the suction nozzle 1 about the axis 4 thereof. A connector 10 is rotatably mounted about its longitudinal axis 10' in the swivel socket or coupling 2 and is detachably connected with a suction hose 8 or the like that leads to the vacuum cleaner. The rotatable mounting and axial fixation of the connector 10 in the swivel socket or coupling 2 is effected via a preferably cylindrical sleeve 9, the outer peripheral surface of which, i.e. its outer surface 18, is inserted into a receiving opening or hole 3 of the swivel socket or coupling 2. The connector 10 is in turn rotatably mounted in the sleeve 9 in such a way that there is play in the axial direction. The connector 10, on that portion 11 thereof that projects into the swivel socket or coupling 2, is provided with a flange 12 that has a larger diameter than the adjacent connector portion 11. The flange 12 extends radially beneath the lower end 15 of the sleeve 9, and thus together with the radially inwardly projecting lower end face or inner shoulder surface 16 of the swivel socket or coupling 2 forms an abutment that delimits the axial play of the connector 10. The rest of the sleeve 9, which is placed in the receiving opening 3 of the swivel socket or coupling 2 for mounting the connector 10, is designed in such a way that a free space is formed between the lower end 15 of the sleeve 9 and the lower end face 16 of the inner receiving opening 3 by the undercut 17 that is provided there. This undercut 17 is dimensioned such that the flange 12 is easily rotatable at the lower end 15 of the sleeve 9 with slight axial play. The sleeve 9 is held in the wall that delimits the cylindrical opening 3 in such a way that it cannot turn. For this purpose, in the illustrated embodiment the sleeve 9 is provided at its upper end with a radially extending circumferential collar 6 that is seated on the upper end of the wall 23 of the opening 3 of the swivel socket or coupling 2. In addition, arresting means are disposed on the outer surface 18 of the sleeve 9 and form radially projecting cams or dogs 19. In the arresting position, these arresting dogs 19 extend into associated openings 22 of the coupling wall 23, and in particular extend into the openings 22 in such a way that the sleeve 9 is reliably held in the swivel socket or coupling 2 in such a way that it cannot move axially or radially. Preferably, two diametrically oppositely disposed arresting openings 22 and associated dogs 19 are provided. To facilitate insertion of the swivel socket or sleeve 9 into the receiving opening 3 of the coupling 2, inclined surfaces 24 are provided on the arresting dogs 19 in the direction of insertion. Furthermore, the sleeve 9, starting from its lower end 15 on both sides of the arresting dogs 19, is provided with slits 25 that extend parallel to the longitudinal axis, with their length extending beyond the arresting dogs 19. By means of these slits 25, or via other suitable means, for example weaker or thinner material in the region of the arresting elements, resilient portions in the form of resilient tongues 28 are formed on which the arresting dogs 19 are seated in such a way that the tongues, together with the arresting dogs 19, can bend inwardly when the sleeve 9 is pressed into the swivel socket or coupling 2. To facilitate location of the correct insertion position of the sleeve 9 to allow the dogs 19 to catch in the openings 22, i.e. for their reliable introduction into these openings, the opening rim 26 of the swivel socket or coupling 2 is provided with a recessed portion 27 (see FIG. 2) that preferably extends inwardly toward the receiving opening 3, and into which the arresting dogs 19 can fit during insertion of the sleeve 9.

As a consequence of the described arrangement and the novel configuration of the sleeve 9, for example as a thermoplastic molded part, the coupling as a whole can be economically mass produced. This thus eliminates a complicated and hence expensive machining or finishing of also the swivel socket or coupling 2 with the undercut 17 for receiving and axially fixing the flange 12 on the connector 10. Furthermore, the connector 10, sleeve 9, and swivel socket or coupling 2 can be easily installed, so that on the whole these parts can be economically produced.

A further exemplary embodiment of the present invention is illustrated in FIGS. 5, 6, and 7. In this embodiment, the sleeve 9' comprises two identical halves 31, 31'. The two delimiting surfaces 32, 33 of the sleeve halves that extend in the axial direction are provided with fixing means 34, 35, for example in the manner of a tongue and groove type connection, which when the two identical halves 31, 31' are joined to form the sleeve 9' mesh with one another and prevent the sleeve halves from shifting axially. This embodiment avoids having to pass the larger diameter flange 12 of the connector 10 through the one-part sleeve 9 of the embodiment of FIGS. 1 to 4. By using the sleeve 9' that is formed of two halves, the two identical halves 31, 31' are placed about the end 11 of the connector 10, whereby the fixing means 34, 35 mesh with one another and the sleeve and connector combination are inserted into the receiving opening 3 of the coupling 2.

The present invention is, of course, in no way restricted to the specific disclosure of the specification and drawings, but also encompasses any modifications within the scope of the appended claims.

What I claim is:

1. A swivel coupling between a suction nozzle and a suction hose of a vacuum cleaner comprising:
    a swivel socket being pivotably connected to said suction nozzle;
    a connecting tube, with a first end portion thereof enclosing said suction hose, and with a second end portion thereof extending into a receiving hole of said swivel socket and being provided with an annular flange;
    a cylindrical sleeve being disposed between said swivel socket and said second end portion of said connecting tube, with said connecting tube being rotatable and axially slidable in said cylindrical sleeve, and with said annular flange of said connecting tube being disposed with play between an inner shoulder face of said swivel socket and an end face of said cylindrical sleeve that is facing said suction nozzle;
    an outer surface of said second end portion of said connecting tube and an inner surface of said sleeve that rests against said outer surface being of a continuous cylindrical shape; and with said outer surface of said sleeve being provided with at least two arresting dog means which engage arresting openings of a wall of said swivel socket, and with said sleeve and said swivel socket being non-rotatably and axially non-slidably connected to one another.

2. A swivel coupling according to claim 1, in which said arresting dog means are provided with inclined surfaces in a direction of insertion of said sleeve into said swivel socket.

3. A swivel coupling according to claim 1, in which, in a region of said arresting dog means, said sleeve is provided with portions that are resiliently flexible in a radial direction.

4. A swivel coupling according to claim 3, in which said resiliently flexible portions are formed by slits of said sleeve, with said slits extending parallel to a longitudinal axis of said sleeve.

5. A swivel coupling according to claim 4, which includes a slit on each side of an arresting dog means.

6. A swivel coupling according to claim 1, in which, at an end facing away from said suction nozzle, an opening rim of said swivel socket is provided with at least one recessed portion that extends inwardly toward said receiving hole.

7. A swivel coupling according to claim 6, in which said recessed portion has a width that is slightly greater than the width of said arresting dog means of said sleeve.

8. A swivel coupling according to claim 1, in which said sleeve comprises two symmetrical halves that can be joined together along contact surfaces that extend parallel to a longitudinal direction of said sleeve.

9. A swivel coupling according to claim 8, in which said sleeve halves are provided with intermeshing fixing means for effecting said joining of said halves.

10. A swivel coupling according to claim 1, in which said sleeve, at an end remote from said end face thereof, is provided with a circumferential collar that extends over an end section of said wall of said swivel socket.

* * * * *

UNITED STATES PATENT AND TRADEMARK OFFICE
CERTIFICATE OF CORRECTION

PATENT NO. : 5,039,133

DATED : 13 August 1991

INVENTOR(S) : ECKART ALBRECHT

It is certified that error appears in the above-identified patent and that said Letters Patent is hereby corrected as shown below:

On Title page;
[30]     Foreign Application Priority Data

Jan. 11 1989[DE]   Fed. Rep. of Germany....3900579

Signed and Sealed this

Twenty-second Day of December, 1992

*Attest:*

DOUGLAS B. COMER

*Attesting Officer*    *Acting Commissioner of Patents and Trademarks*